C. E. SEAL.

Cut-off and Regulating-Cocks for Gas.

No. 5,585.

Reissued September 30, 1873.

Witnesses.

G. Mathys.

Solon A. Hemon

Inventor.

Charles E. Seal

Per

Attorneys.

AM. PHOTO-LITHOGRAPHIC CO. N.Y. (OSBORNE'S PROCESS)

UNITED STATES PATENT OFFICE.

CHARLES E. SEAL, OF WINCHESTER, VIRGINIA, ASSIGNOR OF ONE-HALF INTEREST TO EDWIN F. BROOKS.

IMPROVEMENT IN CUT-OFFS AND REGULATING-COCKS FOR GAS.

Specification forming part of Letters Patent No. 140,549, dated July 1, 1873; reissue No. 5,585, dated September 30, 1873; application filed September 9, 1873.

*To all whom it may concern:*

Be it known that I, CHARLES E. SEAL, of Winchester, in the county of Frederick and State of Virginia, have invented a new and Improved Cut-Off and Regulating-Cock for Gas; and I do hereby declare the following to be a full, clear, and exact description of the same, reference being had to the accompanying drawing forming part of this specification.

The invention consists in a cock or valve attached on or near the gas-meter, or on gas-conveying pipes, and a suitable connection attaching it to valve-lifting mechanism that has been arranged in a room or apartment different from that in which the valve is located.

Figure 3:
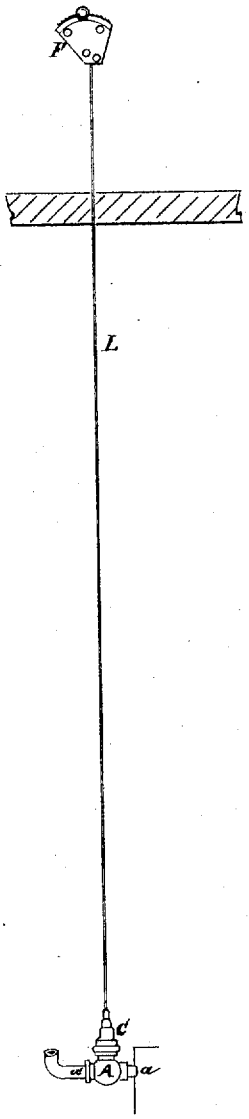
Figure 1:
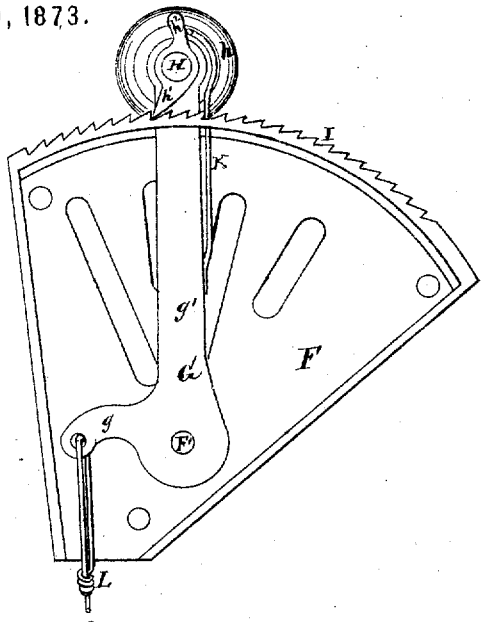
Figure 2:
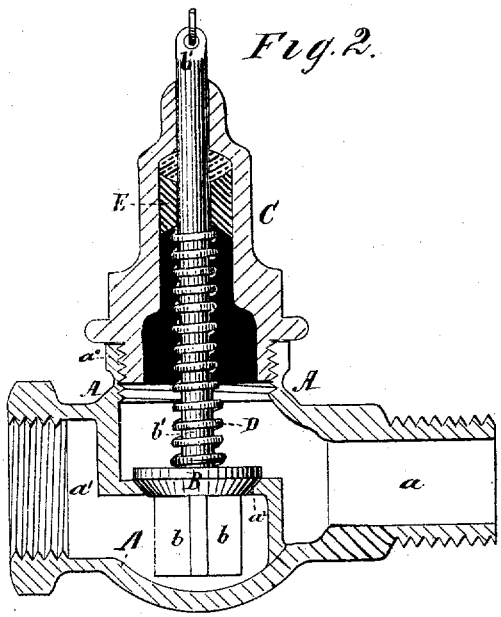

Figure 1 is a side elevation of the box wherein works the mechanism by which the valve at meter is lifted off its seat. Fig. 2 is a vertical section of the valve-chamber and appurtenances. Fig. 3 is a side elevation, showing the valve-chamber and the means for operating it connected together by an intermediate chain or cord.

In the drawing, A represents the valve-chamber, having one end tube, $a$, connecting with the service-pipe, and another, $a^1$, connecting with the meter. B is the valve, which fits on the seat $a^2$, and has guide-flanges $b$ in front, and in the rear a stem, $b'$, which extends through the cap-tube C, and is transversely perforated at the end. The cap-tube C screws into the mouth-tube $a^4$ of valve-chamber.

In order to pack the joint formed between the stem $b'$ and the cap C, I encircle the former with a spring, D, and a front concaved sleeve or slide-tube, E. At the front end of the tube E I place yarn, or other analogous packing, which becomes more tightly packed as the pressure of the gas becomes greater. F is a box to be fastened in a chamber where gas is used, and in which is journaled the rock-shaft F', to which is attached the lever G, having arms $g$ $g'$. Rigidly attached to this lever is also a rock-shaft, H, at one end of whose ends is made fast a knob, $h$, and at the other a pawl, $h^1$, that works in ratchet I on the curve of box F. K is a spring attached to the arm $g'$ of lever, and bearing against the end $h^2$ of pawl to keep it down to the ratchet. L is a wire passed through the end of arm $g$, and connected directly with the end of stem $b'$, or indirectly by an intervening cord.

The operation is as follows: The box, with its appendages, is located in the room or apartment in which the gas is to be used, while the wire connection or chain attaches it to the end of stem $b'$. When night arrives, and it is desired to use the gas, the arm H is pushed up to such a distance on the arc as will lift the valve sufficiently to give the proper supply wanted for one, two, or more burners, and no more. The valve is then held open.

Thus the supply of gas is graduated to suit the wants of the consumer, and no surplus kept under pressure in the house-piping to escape through the joints thereof.

This device is also well adapted to churches, store-rooms, offices, and warehouses, as well as to private dwellings and boarding-houses, and is calculated to save a large percentage of the gas for which money is now paid, but which is never used.

When it is desired by the party to extinguish his gas, instead of doing so at the burner, as is now customary, he holds up the pawl from the socket and allows the spring D to hold the valve B securely to its seat.

Having thus described my invention, what I claim as new, and desire to secure by Letters Patent, is—

1. The combination, with a self-closing valve, B, of an operating mechanism for opening and holding the valve, arranged in a room or apartment different from that in which the valve is located, substantially as described.

2. The valve B, having stem $b'$, valve-chamber A, and connecting-rod L, combined with the lever G and ratchet-and-pawl mechanism I H $h'$, as and for the purpose described.

Witnesses: CHARLES E. SEAL.

RICHARD LOANE,

H. R. GRIMES.